(No Model.)
J. ALEXANDER.
ANIMAL TRAP.
No. 499,079.   Patented June 6, 1893.
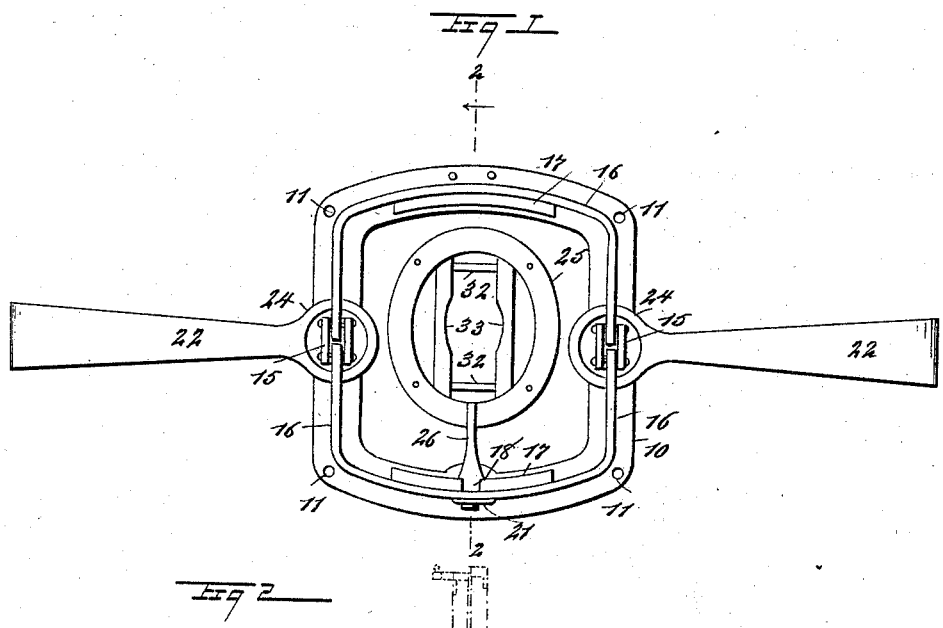
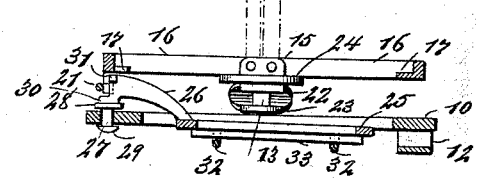
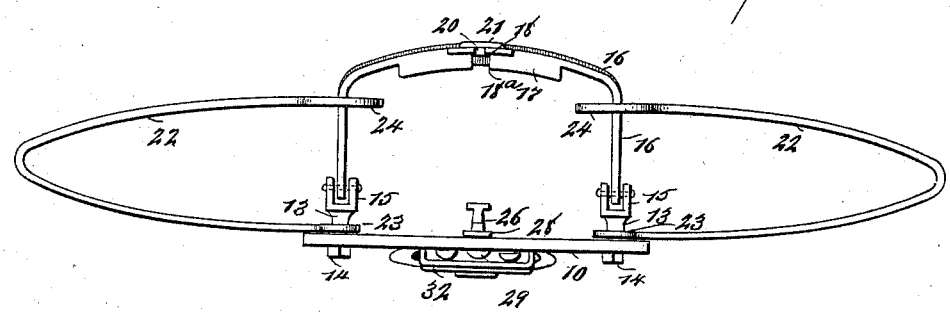
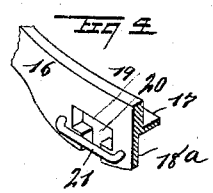
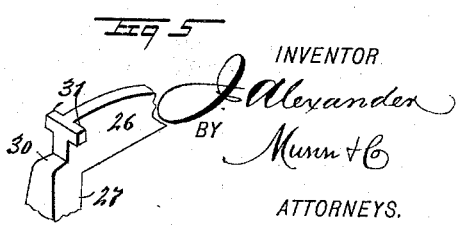
WITNESSES:
H Walker
C. Sedgwick
INVENTOR
J Alexander
BY Munn & Co
ATTORNEYS.

UNITED STATES PATENT OFFICE.

JAMES ALEXANDER, OF LAKEVIEW, IDAHO.

ANIMAL-TRAP.

SPECIFICATION forming part of Letters Patent No. 499,079, dated June 6, 1893.

Application filed December 27, 1892. Serial No. 456,353. (No model.)

*To all whom it may concern:*

Be it known that I, JAMES ALEXANDER, of Lakeview, in the county of Kootenai and State of Idaho, have invented a new and Improved Trap, of which the following is a full, clear, and exact description.

My invention relates to improvements in an animal trap, and the object of my invention is to produce a simple, cheap and exceedingly strong trap, in which the upper sides of the jaws are entirely free and unencumbered when the trap is set, and which is provided with a trip plate which lies very low in the trap; which has a base plate or ring adapted to increase its strength, and to provide space for the movement of the trip plate, which is constructed in such a way that it may be fastened readily to the side of a tree or in any desired place; which has the trip plate pivoted in such a way that it cannot be readily broken; which has means for regulating the size of the opening through the trip plate so as to expose the bait, more or less, when the bait is placed beneath the trip plate; which is provided with means for preventing the leg of an animal from being twisted off when the animal is caught; and which in general is adapted to catch and hold an animal if the trip plate is touched in any way, and is adapted to catch animals of almost any kind.

To this end my invention consists in a trap, the construction of which will be hereinafter described and claimed.

Reference is to be had to the accompanying drawings forming a part of this specification, in which similar figures of reference indicate corresponding parts in all the views.

Figure 1 is a plan view of the trap when set. Fig. 2 is a cross section of the same on the line 2—2 in Fig. 1. Fig. 3 is a side elevation of the trap with the jaws closed. Fig. 4 is a broken detail view of one of the jaws, showing the slot therein to engage the catch on the shank of the trip plate; and Fig. 5 is a broken detail view of the trip plate shank and its fastening catch.

The trap is provided with a ring-like base 10 which adds to the strength of the trap and which offers space for the swing of the trip plate, so that the latter may lie relatively low, and in this plate are holes 11 through which pins, nails, or other fastening devices may be passed, so as to fasten the trap to the ground or to a tree, log, or other support.

The base plate is an important feature of the invention, and as above remarked, it enables the trap to be set upon a tree or log and over a hole therein; which is an advantageous way of setting traps in cold countries, as it keeps the trap high and dry and prevents it from being clogged by snow or ice. On the under side of the base plate and near one edge is a keeper 12, see Fig. 2, into which a stick may be thrust and by this means the trap may be held in any necessary position.

On opposite sides of the trap are posts 13 which are pivoted in the base plate and extend vertically upward, the posts being held in place by nuts or heads 14 on their lower ends. The upper ends of the posts terminate in slotted heads 15 in which are pivoted the lower ends of the oppositely swinging jaws 16, which jaws are of an inverted U-shape; that is, they are shaped like the ordinary steel trap jaws. The jaws are adapted to close together above the trap, and near their upper meeting edges they are provided with flanges 17 which are arranged at right angles to the bodies of the jaws, and which prevent the jaws from cutting too deeply into the leg of an animal and serve as guards to prevent the animal from twisting or gnawing off his leg. One of the flanges 17 is slotted transversely in the middle, as shown at 18, to enable the flange to close down over the shank of the trip plate, as hereinafter described. The jaw which is provided with a slotted flange is also provided with a depending lip 18ª, near the center, see Fig. 4, in which is a longitudinal slot 19, and a branch transverse slot 20 opens downward and outward from the center of the slot 19 and is adapted to receive the trip plate shank. The back side of the slot 20 is closed by a cross bar 21 which prevents the trap from being sprung by the lifting of the trip plate, as hereinafter described.

On opposite sides of the trap and extending outward from the jaws and posts 13, are stiff bent springs 22, the lower ends of which are formed into rings 23 which embrace the posts 13, while the upper ends are formed into larger rings 24 which slide over the heads 15 of the posts and are adapted to run upward on the vertical portions of the closed jaws so as to force and hold the jaws together, as shown clearly in Fig. 3.

The trap is provided with a generally circular ring-shaped trip plate 25 which is held within the base plate 10, and this has extending outward from one side, a bent shank 26, the shank being bent slightly upward, as shown in Fig. 2, and the outer end of the shank terminates in a depending arm 27 which is pivoted in the base plate, see Fig. 2, and is held in place by the collar 28 and head 29. Near the top of the arm 27 is a shoulder 30 against which one of the jaws 16 swings when the jaws are opened, and above this shoulder and on the end of the shank 26 is a catch 31 which projects beyond the sides of the shank 26 and at right angles thereto. This catch 31 is adapted to enter the slot 19 in the jaw 16, and the length of the catch is greater than the width of the slot 20, so that when the catch is swung into engagement with the lower walls of the slot 19, it holds the jaws down until a pressure on the trip plate swings the shank forward and pulls the catch from the slot 19. It will be seen that the cross bar 21 will prevent the outer end of the shank 26 from swinging through the slot 20, and consequently when the cross bar is used the trap cannot be sprung by lifting upward on the trip plate, but if it is desired to have the trap sprung by this movement of the trip plate, the cross bar 21 may be removed and then when the trip plate is lifted the catch will swing outward from the slot 20 and permit the jaws to close.

On the under side of the trip plate and near the ends are transverse keepers 32 which are bent downward slightly and are adapted to secure sticks or twigs 33, which, when held between the keepers and the plate 25, serve to partially close the opening in the trip plate. By using the necessary number of twigs or by regulating their width, the size of the opening through the trip plate may be adjusted so as to expose the bait, which may be beneath the trip plate, to a greater or less extent, as desired.

To set the trap the springs 22 are compressed until the rings 24 swing below the pivots of the jaws 16, after which the jaws are opened and turned down into a position substantially parallel with the base plate 10. The trip plate 25 is then raised slightly which causes the shank 26 to swing upward and the catch 31 to swing outward, so as to enter the slot 19, the outer end of the shank being held midway in the slot 20.

The arm 27 is pivoted loosely enough in the base plate to permit the necessary movement of the shank and trip plate. The catch 31 thus holds the jaws open, but when any pressure is brought to bear upon the trip plate, the latter is depressed, the catch 31 swings forward out of the slot 19, and the pressure of the springs 22 causes the jaws to close suddenly so as to catch between them the leg of any animal which may have sprung the trap.

It will be noticed that the construction described enables the trip plate to lie very low, so that it is impossible for an animal to depress the plate with his toes and pull his leg out before the jaws close upon it. It will also be observed, that when the trap is open, there is nothing whatever above the jaws to interfere with their free movement, and they are sure to catch the animal that springs the trap.

Having thus described my invention, I claim as new and desire to secure by Letters Patent—

1. An animal trap, comprising a ring-like base plate, a pair of spring-pressed jaws pivoted above the base plate and adapted to close together, one of the jaws having a longitudinal slot therein and a transverse slot opening from the longitudinal slot through the edge of the jaw, a trip plate held to swing within the base plate and having an outwardly extending bent shank which terminates in an arm pivoted on the base plate, and a catch secured to the outer end of the shank and adapted to enter the longitudinal slot of the jaw, substantially as described.

2. In a trap, the combination with the base and posts pivoted thereto, of swinging spring-pressed jaws, having flanges located on their engaging portions and extending downward at right angles to the bodies of the jaws, substantially as described.

3. In a trap, the combination of the swinging spring-pressed jaws, one of which is provided with a longitudinal slot and a branch slot leading transversely from the longitudinal slot to the edge of the jaw, the trip plate having a shank adapted to swing into the transverse slot and a catch to enter the longitudinal slot, and a cross bar secured to the jaw and extending across the outer side of the transverse slot, substantially as described.

JAMES ALEXANDER.

Witnesses:
CLIFFORD E. JONES,
MARY E. RAMMELMEYER.